US008290550B2

(12) United States Patent
Kodama

(10) Patent No.: US 8,290,550 B2
(45) Date of Patent: Oct. 16, 2012

(54) ELECTROMAGNETIC FIELD STRENGTH REDUCING DEVICE, ELECTROMAGNETIC FIELD STRENGTH REDUCING METHOD, AND RADIO COMMUNICATION DEVICE

(75) Inventor: Kenichiro Kodama, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 60 days.

(21) Appl. No.: 13/031,650

(22) Filed: Feb. 22, 2011

(65) Prior Publication Data

US 2012/0007694 A1 Jan. 12, 2012

Related U.S. Application Data

(60) Provisional application No. 61/362,539, filed on Jul. 8, 2010.

(51) Int. Cl.
*H04M 1/00* (2006.01)

(52) U.S. Cl. .................................. 455/575.5; 455/575.1

(58) Field of Classification Search ............... 455/575.5, 455/575.1, 550.1, 575.7, 562.1; 343/702
See application file for complete search history.

(56) References Cited

U.S. PATENT DOCUMENTS

| | | | | |
|---|---|---|---|---|
| 6,947,000 | B2 * | 9/2005 | Ito | 343/702 |
| 6,985,113 | B2 * | 1/2006 | Nishimura et al. | 343/702 |
| 7,099,632 | B2 * | 8/2006 | Hong et al. | 455/90.3 |
| 7,146,139 | B2 * | 12/2006 | Nevermann | 455/115.1 |
| 7,151,955 | B2 * | 12/2006 | Huber et al. | 455/575.5 |
| 7,274,953 | B2 * | 9/2007 | Takagi et al. | 455/575.2 |
| 7,330,705 | B2 * | 2/2008 | Lee | 455/117 |
| 7,456,795 | B2 * | 11/2008 | Chiba et al. | 343/702 |
| 7,539,510 | B2 * | 5/2009 | Toyoda et al. | 455/550.1 |
| 8,208,980 | B2 * | 6/2012 | Wong et al. | 455/575.5 |

* cited by examiner

*Primary Examiner* — Sonny Trinh
(74) *Attorney, Agent, or Firm* — Oblon, Spivak, McClelland, Maier & Neustadt, L.L.P.

(57) ABSTRACT

An electromagnetic field strength reducing device includes a high-frequency wave eliminator that eliminates a high frequency component from an electrical signal input from a signal source. An electrical signal line is disposed between the high-frequency wave eliminator and the electrical member so as to convey the electrical signal with the high frequency component eliminated to an electrical member. The device also includes a resonant-frequency regulator connected between the electrical signal line and ground to cause the electrical signal line to be resonant at a frequency used for radio communication. The electromagnetic field strength reducing device may be employed in a portable electronic device with a HAC standard radio frequency communication compliance requirement, and use a corresponding method to eliminate the high frequency component.

20 Claims, 9 Drawing Sheets

ELECTROMAGNETIC FIELD STRENGTH REDUCING DEVICE, ELECTROMAGNETIC FIELD STRENGTH REDUCING METHOD, AND RADIO COMMUNICATION DEVICE

CROSS REFERENCE TO RELATED PATENT APPLICATION

The present application claims the benefit of the earlier filing date of U.S. Provisional Patent Application Ser. No. 61/362,539, filed on Jul. 8, 2010, the entire contents of which being incorporated herein by reference.

BACKGROUND OF THE INVENTION

1. Field of the Invention

The present invention relates to an electromagnetic-field-strength reducing device, an electromagnetic-field-strength reducing method, and a radio communication device which are preferably applied to radio communication equipment having a portion that is brought close to a human ear. Examples of such radio communication equipment include a mobile phone, a PHS (personal handyphone system) phone, a PDA (personal digital assistant) device, a headphone device, a portable game console, and a music player device.

In particular, the present invention relates to an electromagnetic-field-strength reducing device, an electromagnetic-field-strength reducing method, and a radio communication device, which can reduce the electric strength and the magnetic-field strength of a portion of a radio communication device, the portion being brought close to the ear, and which can comply with a standard for a method for measuring compatibility between wireless communication devices and hearing aids, specifically, the HAC (Hearing Aid Compatibility) standard (ANSI C63.19) standardized by the Federal Communications Commission (FCC).

2. Description of the Related Art

Today, digital wireless devices, such as mobile phones, have been widely used. Voice during a phone call with such a digital wireless device is transmitted through a wireless network over radio waves. During a phone call, radio waves (radio frequency emissions) output from the digital wireless device form an electromagnetic field having a pulsed pattern around the antenna of the digital wireless device.

The electromagnetic field may produce a buzzing noise when picked up by a microphone section or a telecoil circuit of the hearing aid, and can adversely affect the wearer of a hearing aid. Thus, it is preferable that the strength of the electromagnetic field (electric field) formed by the digital wireless device be reduced to a level that does not adversely affect the wearer of the hearing aid.

Given this situation, the FCC sets the HAC standard (ANSI C63.19) regarding a method for measuring compatibility between wireless communication devices and hearing aids.

The HAC standard specifies a unified measurement method and parametric requirements regarding electromagnetic compatibility, operation compatibility, and accessibility between hearing aids and digital wireless devices, such as, mobile phones, cordless phones, and VoIP (Voice over Internet Protocol) devices that which operate in a frequency range of 800 to 950 MHz and a frequency range of 1.6 to 2.5 GHz. Accordingly, it is important for the manufactures of the digital wireless devices, such as mobile phones, to manufacture products that comply with the HAC standard.

Through patent research of related art of the present invention, the assignee of the present invention has found the technology disclosed in Japanese Unexamined Patent Application Publication No. 2002-353719.

Japanese Unexamined Patent Application Publication No. 2002-353719 discloses a SAR (specific absorption rate) reducing device for reducing a local averaged SAR by reducing the amount of radiation of electromagnetic waves. In the SAR reducing device, a radiation reducing section that serves as a portion for reducing the amount of electromagnetic wave radiation is provided at an installation surface of a casing and a current source for supplying current is provided at a reverse side of the casing, the reverse side being opposite to the installation surface.

The SAR reducing device has a conductive member that resonates at a frequency used for communication. The conductive member is provided so as to oppose the reverse side of the casing and has an open lower end. In the SAR reducing device, the upper end of the conductive member is connected to ground, located in the vicinity of the current source at the reverse side of the casing, via a conductive short-circuiting member.

In such a SAR reducing device, during communication, the conductive member resonates at a frequency used for the communication. In this case, the impedance of the open lower end of the conductive member becomes ∞ (infinite), and the impedance of the upper end of the conductive member, the upper end being connected to ground, approaches zero.

Thus, since the upper end of the conductive member is connected to the vicinity of the current source, current supplied from the current source flows to the conductive member. Thus, the SAR reducing device can reduce the amount of current flowing from the current source to the emission reducing section and thus can reduce the amount of electromagnetic wave emission from the emission reducing section.

In addition, since the upper end of the conductive member is attached to the reverse side of the casing, the SAR reducing device facilitates provision of the conductive material without ensuring a space for disposing the conductive member on the installation surface of the casing.

SUMMARY

In the case of the SAR reducing device disclosed in Japanese Unexamined Patent Application Publication No. 2002-353719, the radiation reducing section that serves as a portion for reducing the amount of electromagnetic wave radiation is provided at the installation surface of the casing and the conductive member is provided at the reverse side of the casing, the reverse side being opposite to the installation surface. Thus, although the installation space of the conductive member is not necessary at the installation surface side of the casing, the installation space of the conductive member is provided at the reverse side of the casing. That is, the installation space of the conductive member is still necessary in the casing. Furthermore, since the conductive member is a physically large member, the footprint thereof increases and the installation space increases correspondingly. Since the conductive member is a physically large member, the configuration of the SAR reducing device also becomes large scale.

Thus, in the case of the SAR reducing device disclosed in Japanese Unexamined Patent Application Publication No. 2002-353719, as a result of the provisioning of the conductive member in the casing, there are problems in that the thickness of the casing increases and the size of the casing increases.

In view of the forging situation, it is desirable to provide an electromagnetic-field-strength reducing device, an electromagnetic-field-strength reducing method, and a radio communication device which can be realized with a simple configuration and a small footprint, which can prevent an inconvenience of the housing becoming large, and which can reduce an electric field strength and a magnetic field strength in a radio communication device to a level that complies with the specifications of the HAC standard.

In order to solve the above-described problems, an electromagnetic-field strength reducing device according to one embodiment of the present invention includes: a high-frequency wave eliminator that eliminates a predetermined high frequency from an electrical signal input to an electrical member provided in the vicinity of a portion at which an electric field strength and a magnetic field strength are to be reduced; an electrical signal line through which the electrical signal from which the high frequency was eliminated by the high-frequency wave eliminator is input to the electrical member; and a resonant-frequency regulator connected between the electrical signal line, located between the high-frequency wave eliminator and the electrical member, and ground to cause the electrical signal line to resonate at a predetermined frequency used for radio communication.

In order to solve the above-described problems, an electromagnetic-field strength reducing device according to one embodiment of the present invention includes the steps of: connecting a high-frequency wave eliminator to an electrical signal line through which an electrical signal is input to an electrical member provided in the vicinity of a portion at which an electric field strength and a magnetic field strength are to be reduced, the high-frequency wave eliminator eliminating a predetermined high frequency from the electrical signal; providing a resonant-frequency regulator between the electrical signal line, located between the high-frequency wave eliminator and the electrical member, and ground to cause the electrical signal line to resonate at a predetermined frequency used for radio communication; and causing the electrical signal line between the high-frequency eliminator and the electrical member to operate as part of an antenna corresponding to the predetermined frequency used for the radio communication, to thereby change current distribution in the vicinity of the electrical member to reduce the electric field strength and the magnetic field strength in the vicinity of the electrical member.

In order to solve the above-described problems, a radio communication device according to one embodiment of the present invention includes: a radio communicator that performs radio communication at a predetermined frequency; a high-frequency wave eliminator that eliminates a predetermined high frequency from an electrical signal input to an electrical member provided in the vicinity of a portion at which an electric field strength and a magnetic field strength are to be reduced; an electrical signal line through which the electrical signal from which the high frequency was eliminated by the high-frequency wave eliminator is input to the electrical member; and a resonant-frequency regulator connected between the electrical signal line, located between the high-frequency wave eliminator and the electrical member, and ground to cause the electrical signal line to resonate at the predetermined frequency used for the radio communication.

According to aspects of the present disclosure, the resonant-frequency regulator for causing the electrical signal line to resonate at the predetermined frequency used for the radio communication is provided between the electrical signal line, located between the high-frequency wave eliminator and the electrical member, and ground. The electrical signal line between the high-frequency wave eliminator and the electrical member is caused to operate as part of the antenna corresponding to the predetermined frequency used for the radio communication, to thereby change a current distribution in the vicinity of the electrical member to reduce the electric field strength and the magnetic field strength in the vicinity of the electrical member.

The present invention allows the electric field strength and the magnetic field strength in the vicinity of the electrical member to be reduced with a simple configuration in which a resonant-frequency regulator for causing the electrical signal line to resonate at the predetermined frequency used for the radio communication is provided between the electrical signal line, located between the high-frequency wave eliminator and the electrical member, and ground.

The device can be realized with a small footprint since it can be realized with the simple configuration in which the resonant-frequency regulator for causing the electrical signal line to resonate at the predetermined frequency used for the radio communication is provided between the electrical signal line, located between the high-frequency wave eliminator and the electrical member, and ground. Thus, it is possible to prevent an inconvenience of the housing becoming large.

Thus, the device can be realized with a simple configuration and a small footprint. It is also possible to prevent an inconvenience of the housing becoming large and it is also possible to reduce an electric field strength and a magnetic field strength at a desired portion in the vicinity of the electrical member up to a level that complies with, for example, the specifications of the HAC standard.

DESCRIPTION OF THE DISCLOSED EMBODIMENTS

The present invention is applicable, among other things, to a mobile phone, which is one example. A mobile phone according to a first embodiment of the present invention will be described first.

First Embodiment

[Electrical Configuration of Mobile Phone]

Figure 1:
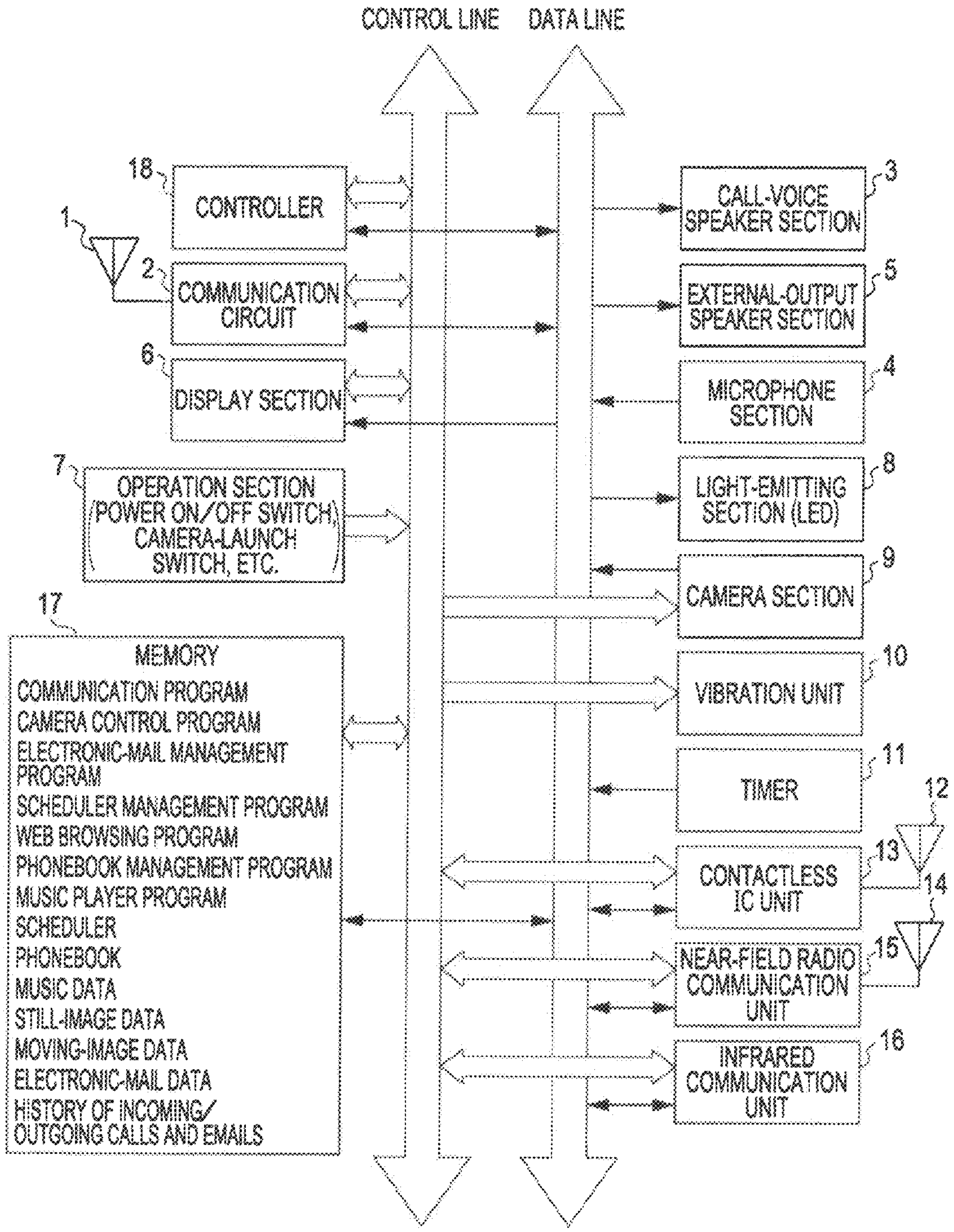
FIG. 1 is a block diagram of a mobile phone according to a first embodiment of the present invention.

FIG. 1 is a block diagram showing a schematic electrical configuration of a mobile phone according to a first embodiment of the present invention. As shown in FIG. 1, the mobile phone according to the first embodiment has an antenna 1 and a communication circuit 2, which perform radio communication with a base station. Examples of the radio communication include voice call, videophone call, electronic mail, and Web (World Wide Web) data communication.

The mobile phone further includes a call-voice speaker section 3 for providing an audio output such as a received call voice, a microphone section 4 for collecting sound such as a call voice to be transmitted, and an external-output speaker section 5 for obtaining an audio output corresponding to audio data played back based on a music player program (described below).

The mobile phone further includes a display section 6 and an operation section 7. The display section 6 displays, for example, an operation menu, electronic mail, and images (still images and moving images), as well as operation keys, such as numeric keys, an execution key, an on-hook key, an off-hook key, and so on. The operation section 7 has operation keys, such as a power on/off key (button) for turning on/off a main power supply of the mobile phone and a camera-launch switch for launching a camera section 9 (described below).

That is, this mobile phone has operation keys displayed on the display section 6 in accordance with a function used by a user and operation keys (e.g., the power on/off key and the camera-launch key) physically provided on the housing of the mobile phone.

For example, for making an outgoing call, the display section 6 displays operation keys corresponding to the function, such as the numeric keys, the on-hook key, and the off-hook key. The display section 6 may be implemented by a touch panel. A controller 18 detects, of the operation keys displayed on the display section 6, an operation key touched/operated by the user. In response to the detected operation key, the controller 18 performs processing, such as phone-number input processing and outgoing-call processing.

The mobile phone further includes a light-emitting section 8 (e.g., an LED; light emitting diode) for notifying the user about an incoming/outgoing call and so on by means of light, the aforementioned camera section 9 for capturing a still image or a moving image of a desired subject, a vibration unit 10 for notifying the user about an incoming/outgoing call and so on by vibrating the housing of the mobile phone, and a timer 11 for clocking the current time.

The mobile phone further has a contactless radio communication antenna 12 and a contactless IC (integrated circuit) unit 13 for performing contactless radio communication at a communication distance of, for example, about 50 cm and a near-field radio communication antenna 14 and a near-field radio communication unit 15 for performing near-field radio communication at a communication distance of, for example, about 10 m.

The mobile phone further has an infrared communication unit 16 for performing infrared communication, a memory 17, and the above-described controller 18 for controlling an entire operation of the mobile phone. The memory 17 stores, for example, a communication program for performing radio communication processing via the base station, various application programs, and various types of data handled by the application programs.

The memory 17 further stores a camera control program for controlling image capture of the camera section 9, in addition to the communication program and so on. The camera control program has a viewer feature for viewing a captured still image and a captured moving image.

The memory 17 further stores an electronic-mail management program and a scheduler management program. The electronic-mail management program is used to control creation and sending/receiving of electronic mail. The scheduler management program is used to manage a scheduler in which the schedule of the user is registered.

The memory 17 further stores a web browsing program, a phonebook management program, and a music player program. Through access to a server apparatus provided on a predetermined network such as a communications network or the Internet, the web browsing program transmits/receives information to thereby allow viewing or the like of web pages. The phonebook management program manages a phonebook. The music player performs playback of music data.

The memory 17 further stores a scheduler in which the user's desired schedule is registered (i.e., an area in which schedule data is registered) and a phonebook in which the names, still images (e.g., facial pictures), addresses, phone numbers, electronic-mail addresses, and birthdates of contacts, such as acquaintances and friends, of the user are registered (i.e., an area in which personal information of contacts is registered).

The memory 17 further stores, for example, music data played back based on the music player program, still-image data and moving-image data played back based on the viewer function of the camera control program, sent/received-electronic-mail data, and history of incoming/outgoing phone calls and electronic mails.

[External Configuration of Mobile Phone]

Figure 2:
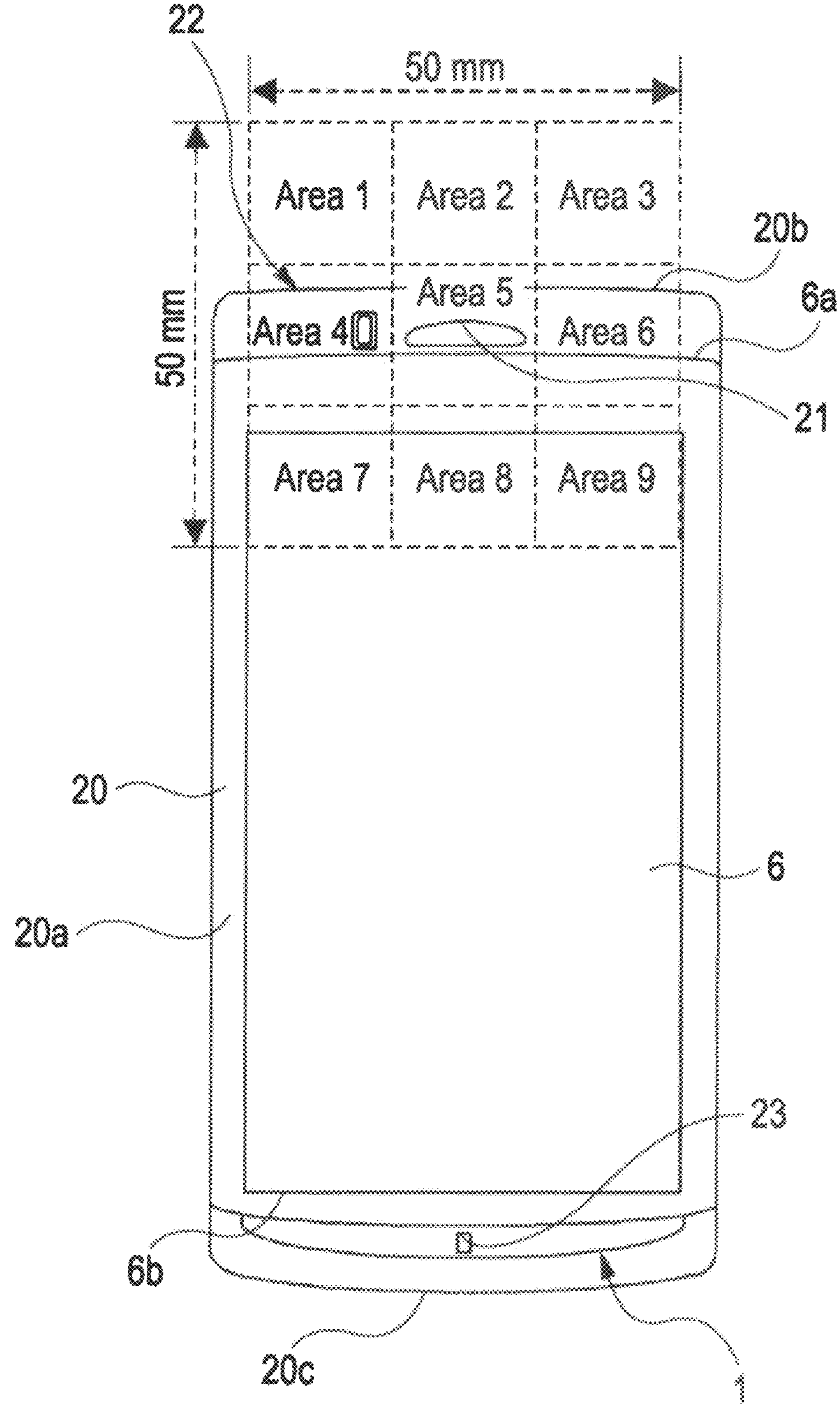
FIG. 2 is a front view of the mobile phone according to the first embodiment.

FIG. 2 is a front view of the mobile phone according to the first embodiment. As shown in FIG. 2, the mobile phone has a generally rectangular-plate-shaped housing 20. The housing 20 has a front portion 20*a* provided with the display section 6, which has a rectangular shape that is slightly smaller than the front portion 20*a*.

A call-voice outputting hole portion 21 for outputting call voice is provided, in the front portion 20*a* of the housing 20, in a region between an upper edge portion 6*a* of the display section 6 and an upper edge portion 20*b* of the housing 20. The call-voice speaker section 3, is provided, in the housing 20, at a position below the call-voice outputting hole portion 21. Call voice output from the call-voice speaker section 3 is output from the housing 20 through the call-voice outputting hole portion 21.

In the case of this mobile phone, a power on/off switch 22 for turning on/off the main power supply of the mobile phone is provided at a side surface portion in the lateral direction of the housing 20, that is, at the upper edge portion 20*b* of the housing 20. The power on/off switch 22 is one of the operation keys of the operation section 7 physically provided at the housing 20.

In the case of this mobile phone, a call-voice receiving hole portion 23 for receiving call voice and so on uttered by the user is provided in a region between a lower edge portion 6*b* of the display section 6 and a lower edge portion 20*c* of the housing 20. The microphone section 4 is provided, in the housing 20, at a position below the call-voice receiving hole portion 23. Call voice received through the call-voice receiving hole portion 23 is converted into electrical signals by the microphone section 4 and the electrical signals are wirelessly transmitted via the communication circuit 2 shown in FIG. 1.

The antenna 1 is built into the housing 20 between the lower edge portion 6*b* of the display section 6 and the lower edge portion 20*c* of the housing 20.

Figure 3:
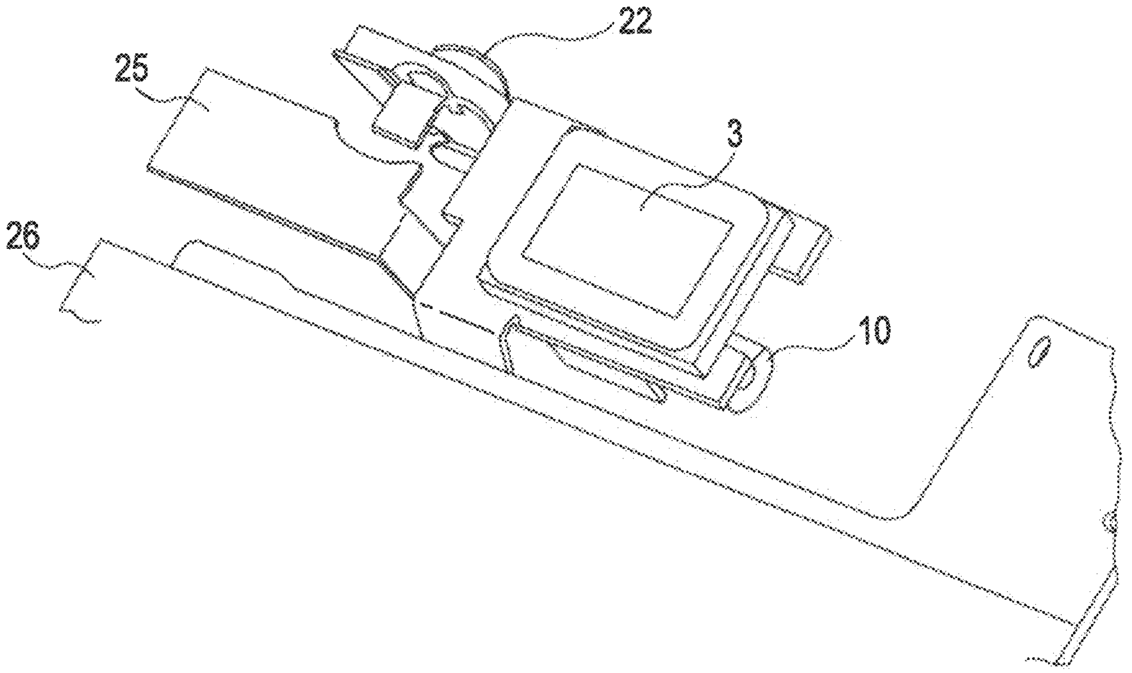
FIG. 3 is a perspective view of a region in the vicinity of a call-voice speaker section provided in the mobile phone of the first embodiment as viewed from the call-voice speaker section side.
Figure 4:
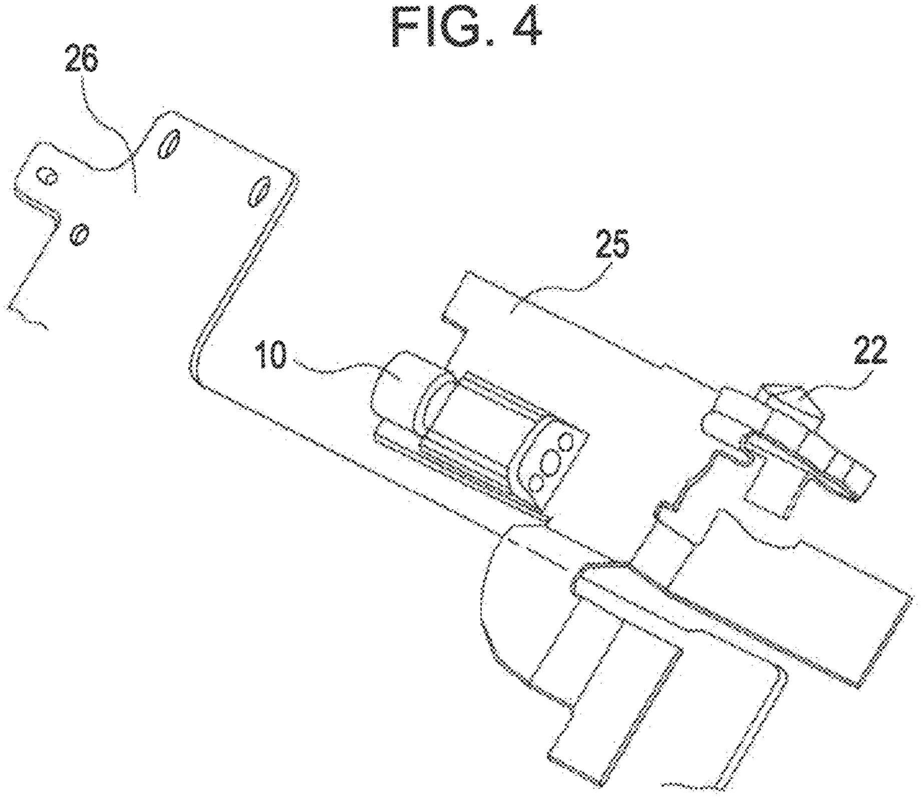
FIG. 4 is a perspective view of a region in the vicinity of the call-voice speaker section provided in the mobile phone of the first embodiment as viewed from the reverse side of the call-voice speaker section side.

FIG. 3 is a perspective view of the call-voice speaker section 3 provided in the housing 20 as viewed from the call-voice outputting hole portion 21. FIG. 4 is a perspective view of, in the housing 20, a region in which the call-voice speaker section 3 is provided, as viewed from the opposite side of the call-voice outputting hole portion 21 (i.e., from the back side of the housing 20). That is, FIG. 3 shows an obverse side of the call-voice speaker section 3 and FIG. 4 shows a reverse side of the call-voice speaker section 3.

As shown in FIGS. 3 and 4, in the case of this mobile phone, the call-voice speaker section 3 is provided on a flexible substrate 25. The flexible substrate 25 is electrically and physically connected to a solid substrate 26.

The flexible substrate 25 has the power on/off switch 22, which is used to turn on/off the main power supply of the mobile phone, in close proximity to the call-voice speaker section 3.

The flexible substrate 25 further has the vibration unit 10 at a position corresponding to the reverse side of the call-voice speaker section 3, (i.e., at the opposite side of the sound-outputting side), as shown in FIG. 4.

That is, in the case of this mobile phone, the vibration unit 10 and the power on/off switch 22 are provided in close proximity to the call-voice speaker section 3. In this mobile phone, a signal line for the vibration unit 10 or a signal line for the power on/off switch 22 is caused to operate as part of an antenna for a frequency band that the mobile phone uses for radio communication. This arrangement is aimed to reduce an electric-field strength and a magnetic-field strength of each of 50-millimeter-square areas 1 to 9 (indicated by dotted squares in FIG. 2) centering around the call-voice outputting hole portion 21 (or the call-voice speaker section 3).

[Operation of Reducing Electromagnetic Field Strength]

Figure 5:
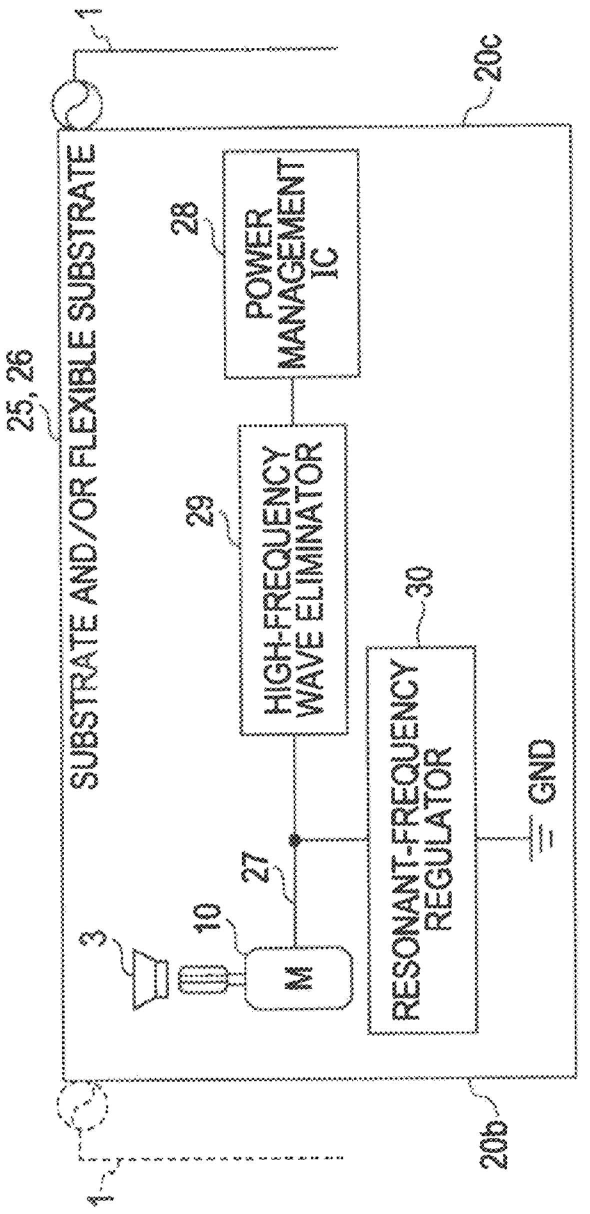
FIG. 5 is a block diagram of a major portion of the mobile phone of the first embodiment.

FIG. 5 is a block diagram of a configuration in which the signal line for the vibration unit 10 is caused to operate as part of the antenna corresponding to the frequency band that the mobile phone uses for the radio communication.

As shown in FIG. 5, the vibration unit 10 provided on the flexible substrate 25 is connected to a power management IC 28, which is provided on the solid substrate 26, through a signal line 27.

The signal line 27 is provided with a high-frequency wave eliminator 29 for eliminating high-frequency components from a drive signal supplied from the power management IC 28 to the vibration unit 10.

A resonant-frequency regulator 30 for causing the signal line 27 to resonate at a predetermined frequency that the mobile phone uses for the radio communication is provided between the signal line 27 and ground GND.

In the case of this mobile phone, although the antenna 1 has been described above as being provided in the vicinity of the lower edge portion 20*c* of the mobile phone, the antenna 1 may be provided in the vicinity of the upper edge portion 20*b* of the mobile phone, as denoted by a dotted line in FIG. 5. In either the case in which the antenna 1 is provided in the vicinity of the lower edge portion 20*c* of the mobile phone or the case in which the antenna 1 is provided in the vicinity of the upper edge portion 20*b* of the mobile phone, there is an advantage in that an electric field strength and a magnetic field strength around the call-voice speaker section 3 are reduced as described below.

Figure 6:
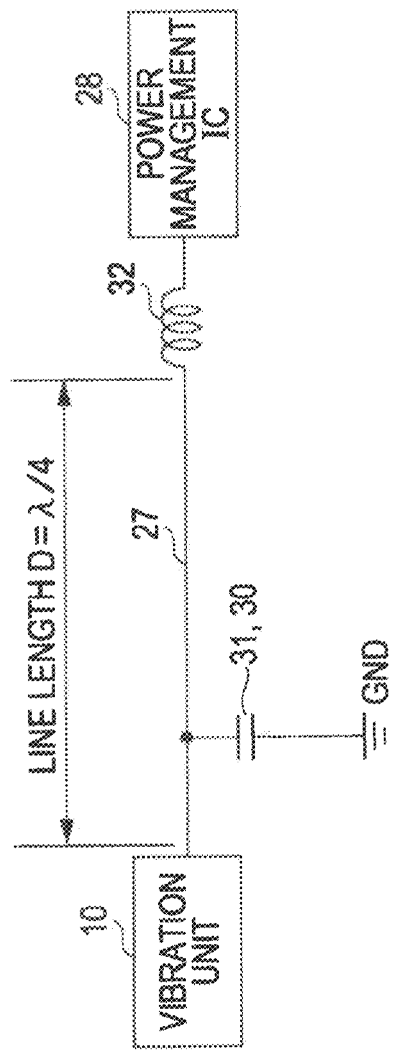
FIG. 6 is a circuit diagram of a major portion of the mobile phone of the first embodiment.

FIG. 6 shows a specific example of the high-frequency wave eliminator 29 and the resonant-frequency regulator 30. In the case of the mobile phone according to the first embodiment, a choke coil 32 having a constant that causes an open circuit with respect to a high frequency is provided as the high-frequency wave eliminator 29.

In the case of the mobile phone according to the first embodiment, the length D of the signal line 27 between the choke coil 32 and the vibration unit 10 is $\lambda/4$ of the antenna length corresponding to the frequency band that the mobile phone uses for the radio communication. For example, when the mobile phone is to perform radio communication in a band of 1900 MHz, the length D of the signal line 27 is about 3.9 cm.

A bypass capacitor 31 having a constant that causes a short circuit with respect to a high frequency and that causes an open circuit with respect to the drive signal for the vibration unit 10 is provided as the resonant-frequency regulator 30 between the signal line 27 and ground GND.

With this arrangement, the signal line 27, the choke coil 32, and the bypass capacitor 31 allows passage of the drive signal for the vibration unit 10 without any influence thereon. Thus, the drive signal output from the power management IC 28 vibrates and drives the vibration unit 10.

In contrast, with respect to high frequency signals that propagate through the signal line 27, the signal line 27, the choke coil 32, and the bypass capacitor 31 operate as a so-called "wave trap". The signal line 27 operates as part of the antenna corresponding to a high frequency band that the mobile phone uses for the radio communication.

Figure 7:
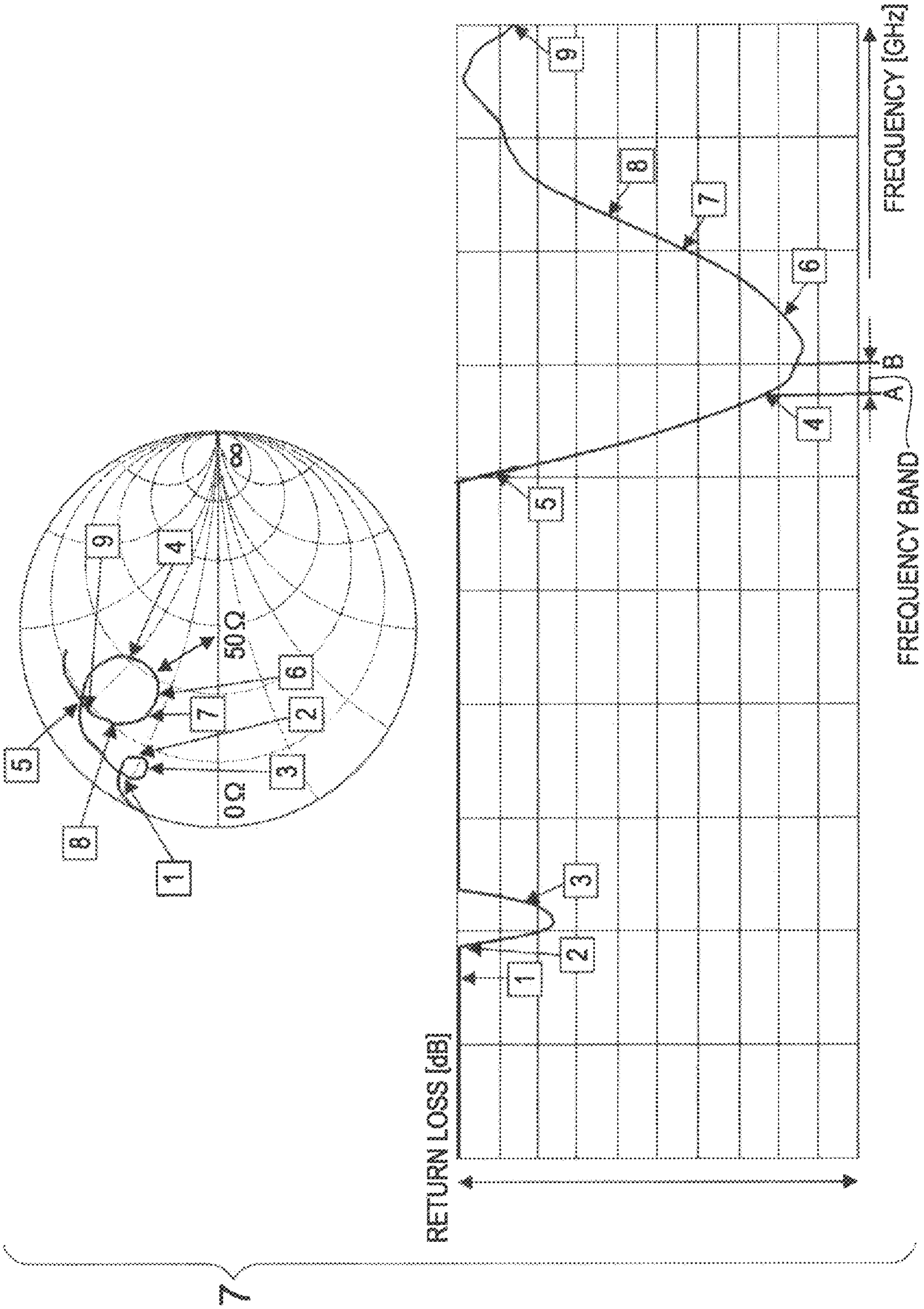
FIG. 7 illustrates electric-field and magnetic-field strength reduction effects of the mobile phone of the first embodiment.

FIG. 7 shows a graph showing a frequency versus a return loss (an amount of reflection attenuation) when the length of the signal line 27 for the vibration unit 10 is $\lambda/4$ of the antenna length and the choke coil 32 and the bypass capacitor 31 are connected to the signal line 27. FIG. 7 also shows an impedance chart, expressed by a Smith chart, that corresponds to the graph.

Numeric values 1 to 9 shown in the graph in FIG. 7 represent measurement points of return losses at corresponding frequencies. A frequency band of A to B GHz in the graph is used for the radio communication of the mobile phone. It can be understood from the graph that, when the length of the signal line 27 for the vibration unit 10 is $\lambda/4$ of the antenna length and the choke coil 32 and the bypass capacitor 31 are connected to the signal line 27, the signal line 27 operates as an antenna for the frequency band of A to B GHz.

Numeric values 1 to 9 in the impedance chart represent impedances of the signal line 27 which correspond to the measurement points in the graph. It can also be understood from the impedance chart that, in a frequency band between measurement point 4 and measurement point 6 (i.e., in a frequency band of A to B GHz), the impedance of the signal line 27 approaches 50Ω and the signal line 27 operates as an antenna for the frequency band of A to B GHz.

Figure 8A:
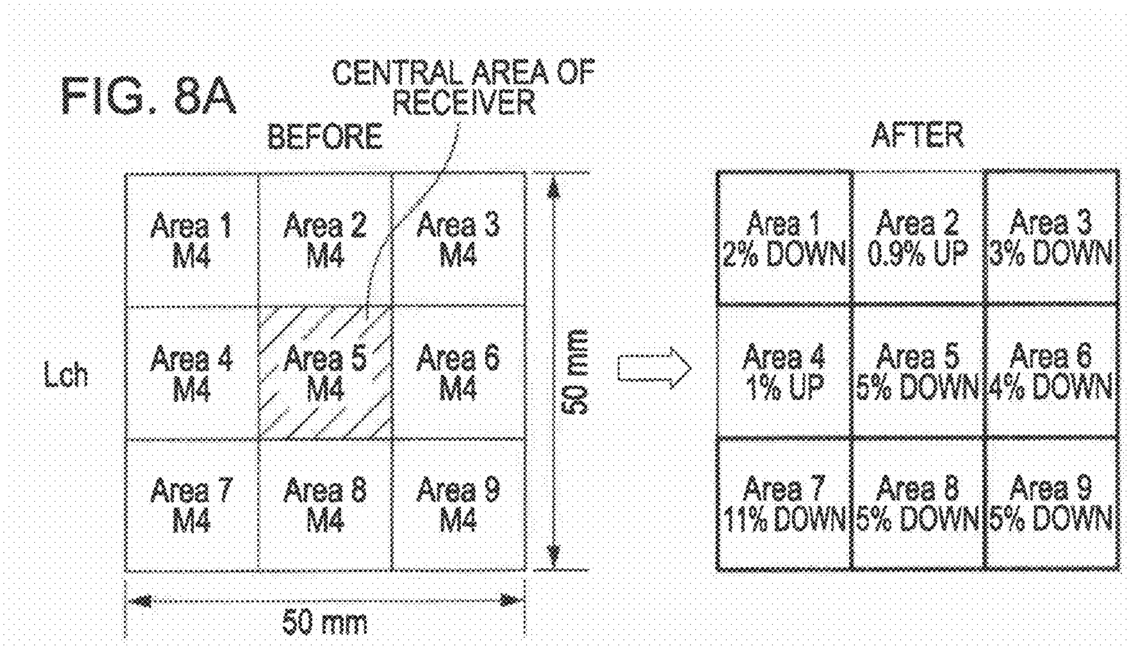
FIGS. 8A to 8C illustrate electric-field and magnetic-field strength reduction effects of the mobile phone of the first embodiment.
Figure 8B:
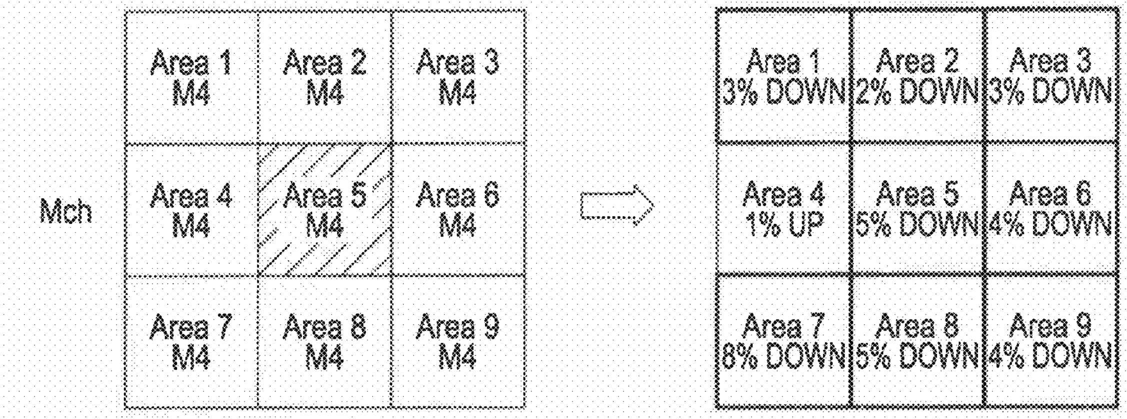
Figure 8C:
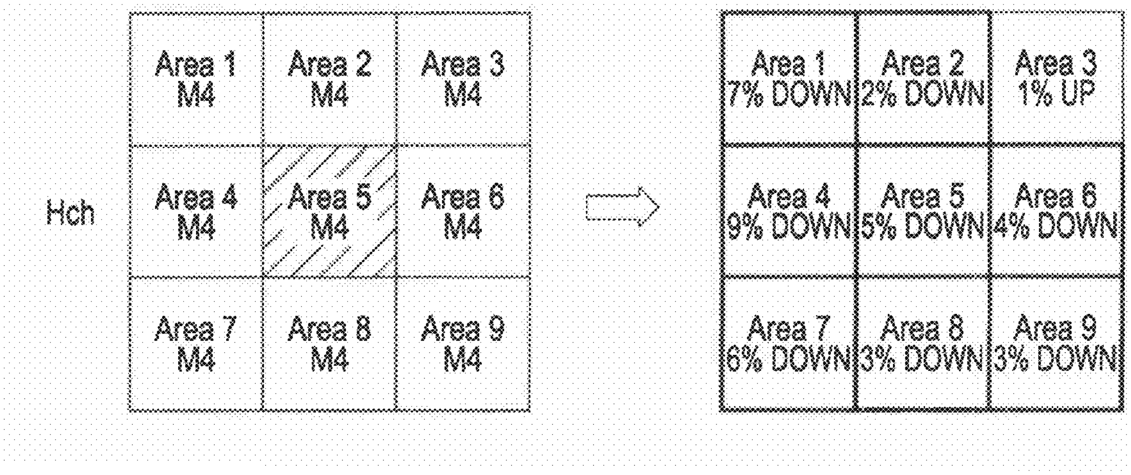

FIGS. 8A to 8C show changes in the electric-field strength and the magnetic-field strength of each of the 50-millimeter-square areas 1 to 9 (indicated by the dotted squares in FIG. 2) centering around the call-voice outputting hole portion 21 (or the call-voice speaker section 3).

The area 5 corresponds to the call-voice outputting hole portion 21 (the call-voice speaker section 3) and the areas 1 to 3, the area 4, the area 6, and the areas 7 to 9 are areas that surround the area 5. Character "Lch" in FIG. 8A indicates a low-frequency channel in a frequency band that the mobile phone uses for the radio communication, character "Mch" in FIG. 8B indicates a middle frequency channel in the frequency band that the mobile phone uses for the radio communication, and character "Hch" in FIG. 8C indicates a high-frequency channel in the frequency band that the mobile phone uses for the radio communication.

In the Hearing Aid Compatibility (HAC) standard set by the Federal Communications Commission (FCC), an electric field and a magnetic field are each classified into rated categories of M1, M2, M3, and M4. A larger numeric value of the "M" rating indicates that the signal quality of the mobile phone is higher.

The character "M4" in FIGS. 8A-8C indicates that this mobile phone has already satisfied the M4 rating, which is the highest rating in the HAC standard. For the mobile phone satisfying the M4 rating, the length of the signal line 27 for the vibration unit 10 was set to λ/4 of the antenna length and the choke coil 32 and the bypass capacitor 31 were connected to the signal line 27. With this arrangement, in the band "Lch", the electric field strength and the magnetic field strength in the area 1 were reduced by 2%, the electric field strength and the magnetic field strength in the area 3 were reduced by 3%, the electric field strength and the magnetic field strength in the area 5 were reduced by 5%, the electric field strength and the magnetic field strength in the area 6 were reduced by 4%, the electric field strength and the magnetic field strength in the area 7 were reduced by 11%, the electric field strength and the magnetic field strength in the area 8 were reduced by 5%, and the electric field strength and the magnetic field strength in the area 9 were reduced by 5%.

Similarly, in the band "Mch", the electric field strength and the magnetic field strength in the area 1 were reduced by 3%, the electric field strength and the magnetic field strength in the area 2 were reduced by 2%, the electric field strength and the magnetic field strength in the area 3 were reduced by 3%, the electric field strength and the magnetic field strength in the area 5 were reduced by 5%, the electric field strength and the magnetic field strength in the area 6 were reduced by 4%, the electric field strength and the magnetic field strength in the area 7 were reduced by 8%, the electric field strength and the magnetic field strength in the area 8 were reduced by 5%, and the electric field strength and the magnetic field strength in the area 9 were reduced by 4%.

Similarly, in the band "Hch", the electric field strength and the magnetic field strength in the area 1 were reduced by 7%, the electric field strength and the magnetic field strength in the area 2 were reduced by 2%, the electric field strength and the magnetic field strength in the area 4 were reduced by 9%, the electric field strength and the magnetic field strength in the area 5 were reduced by 5%, the electric field strength and the magnetic field strength in the area 6 were reduced by 4%, the electric field strength and the magnetic field strength in the area 7 were reduced by 6%, the electric field strength and the magnetic field strength in the area 8 were reduced by 3%, and the electric field strength and the magnetic field strength in the area 9 were reduced by 3%.

[Advantage of First Embodiment]

As is apparent from the above description, in the mobile phone according to the first embodiment, the signal line 27 for the vibration unit 10 provided in close proximity to the call-voice speaker section 3 is set to λ/4 of the antenna length, the choke coil 32 having a constant that causes an open circuit with respect to a high-frequency signal is connected to the signal line 27, and the bypass capacitor 31 having a constant that causes a short circuit with respect to a high-frequency signal and that cause an open circuit with respect to the drive signal for the vibration unit 10 is connected between the signal line 27 and ground. The signal line 27 is caused to resonate at a frequency used for the radio communication of the mobile phone so as to operate as part of the antenna.

This arrangement makes it possible to change the current distribution around the call-voice speaker section 3 and also makes it possible to reduce the electric field strength and the magnetic field strength in the area 5 corresponding to the installation position of the call-voice speaker section 3 and the electric field strength and the magnetic field strength in each of the areas 1 to 3, the area 4, the area 6, and the areas 7 to 9 around the call-voice speaker section 3. This makes it possible to provide the mobile phone with a high signal quality that meets the specifications of the HAC standard.

This configuration can be achieved by merely connecting the choke coil 32 to the signal line 27 for the vibration unit 10 provided in close proximity to the call-voice speaker section 3 and disposing the bypass capacitor 31 between the signal line 27 and ground. Since the choke coil 32 and the bypass capacitor 31 can be disposed in a considerably small area, it is possible to prevent the installation area of the member for reducing the electric field strength and the magnetic field strength from causing inconvenience of the housing of the mobile phone becoming large.

When the mobile phone has already satisfied the M3 rating or M4 rating of the HAC standard, it is also possible to improve the signal quality by further reducing the electric field strength and the magnetic field strength than those of the M3 rating and M4 rating.

Second Embodiment

A mobile phone according to a second embodiment of the present invention will be described next. In the mobile phone of the first embodiment described above, the choke coil 32 that serves as the high-frequency wave eliminator 29 is provided on the signal line 27 and in close proximity to the power management IC 28. In contrast, according to the mobile phone of the second embodiment, the choke coil 32 that serves as the high-frequency wave eliminator 29 is provided at a position in close proximity to the power management IC 28 of the signal line 27 and a choke coil that serves as a high-frequency wave eliminator is also provided at a position in proximity to the vibration unit 10 of the signal line 27.

The mobile phone of the second embodiment is different from the mobile phone of the first embodiment in that the two choke coils are provided. Thus, hereinafter, only the difference is described and a redundant description is not given.

[Configuration of Major Portion of Mobile Phone of Second Embodiment]

Figure 9:
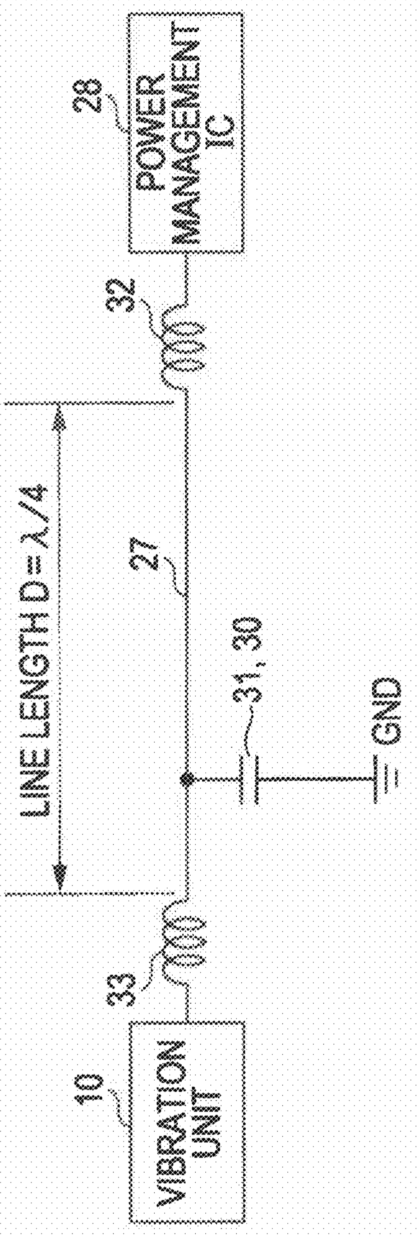
FIG. 9 is a circuit diagram of a major portion of a mobile phone according to a second embodiment of the present invention.

FIG. 9 shows a major portion of the mobile phone of the second embodiment. As shown in FIG. 9, the mobile phone of the second embodiment has a configuration in which the signal line 27 that provides electrical and physical connection between the vibration unit 10 provided in close proximity to the call-voice speaker section 3 and the power management IC 28 provided on the substrate 26, as described above, has a choke coil 32 at a position in close proximity to the power management IC 28 and also has a choke coil 33 at a position in close proximity to the vibration unit 10.

The length D of the signal line 27 between the choke coil 32, provided at the position in close proximity to the power management IC 28, and the choke coil 33, provided at the position in close proximity to the vibration unit 10, is λ/4 of the antenna length corresponding to a frequency band that the mobile phone uses for the radio communication.

A bypass capacitor 31 having a constant that causes a short circuit with respect to a high frequency and that causes an open circuit with respect to the drive signal for the vibration unit 10 is connected as the resonant-frequency regulator 30 between a node of the choke coils 32 and 33 and ground.

[Operation and Advantage of Second Embodiment]

In the case of the mobile phone of the second embodiment, the choke coil 32 eliminates high-frequency components from the drive signal for the vibration unit 10 immediately after the drive signal was output from the power management IC 28 and the choke coil 33 further eliminates high-frequency components from the drive signal immediately before it is supplied to the vibration unit 10 and supplies the resulting drive signal to the vibration unit 10.

This arrangement provides an advantage in that the vibration unit 10 can be stably driven with the drive signal from which high-frequency components are further eliminated. The arrangement can also has the same advantages as the mobile phone of the first embodiment, for example, an advantage of being able to reduce the electric field strength and the magnetic field strength around the call-voice speaker section 3 by causing the signal line 27 to resonate at a frequency that the mobile phone uses for the radio communication to thereby cause the signal line 27 to operate as part of the antenna.

Third Embodiment

A mobile phone according to a third embodiment of the present invention will be described next. The mobile phone of the second embodiment described above has a configuration in which the choke coil 32 that serves as the high-frequency wave eliminator 29 is provided on the signal line 27 and in close proximity to the power management IC 28 and the choke coil 33 that serves as the high-frequency wave eliminator is also provided on the signal line 27 and in proximity to the vibration unit 10. In contrast, the mobile phone of the third embodiment further includes a termination resistor between the bypass capacitor 31 and ground, in addition to the choke coils 32 and 33 described above.

The mobile phone of the third embodiment is different from the mobile phone of the second embodiment in that the termination resistor is provided. Thus, hereinafter, only the difference is described and a redundant description is not given.

[Configuration of Major Portion of Mobile Phone of Third Embodiment]

Figure 10:
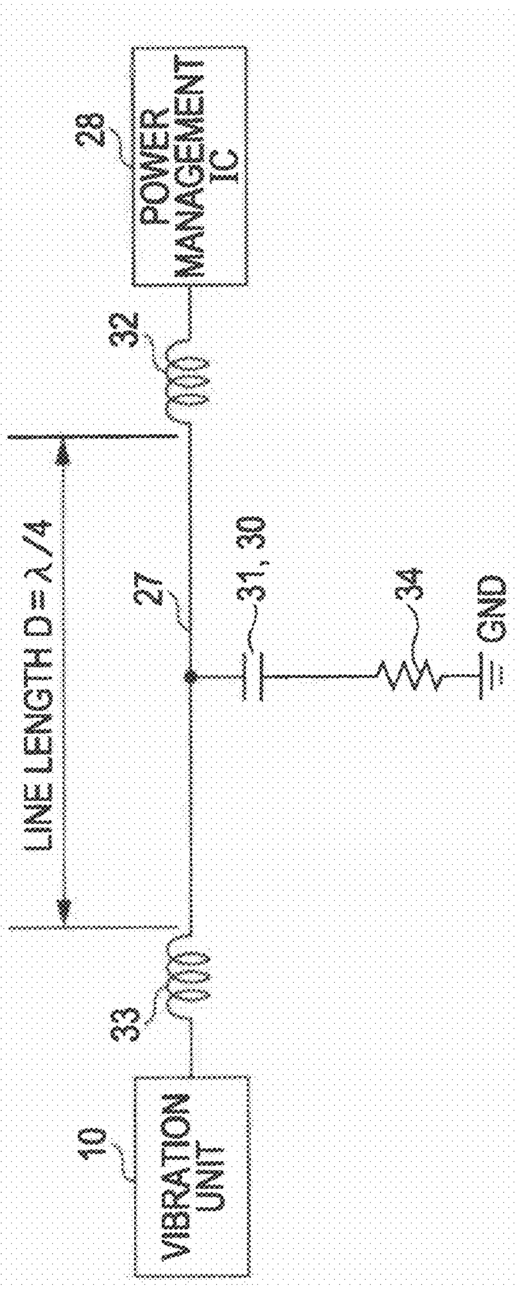
FIG. 10 is a circuit diagram of a major portion of a mobile phone according to a third embodiment of the present invention.

FIG. 10 shows a major portion of the mobile phone of the third embodiment. As shown in FIG. 10, the mobile phone of the third embodiment has a configuration in which the signal line 27 that provides electrical and physical connection between the vibration unit 10 provided in close proximity to the call-voice speaker section 3 and the power management IC 28 provided on the substrate 26, as described above, has a choke coil 32 at a position in close proximity to the power management IC 28 and also has a choke coil 33 at a position in close proximity to the vibration unit 10.

The length D of the signal line 27 between the choke coil 32, provided at the position in close proximity to the power management IC 28, and the choke coil 33, provided at the position in close proximity to the vibration unit 10, is λ/4 of the antenna length corresponding to a frequency band that the mobile phone uses for the radio communication.

A bypass capacitor 31 having a constant that causes a short circuit with respect to a high frequency and that causes an open circuit with respect to the drive signal for the vibration unit 10 is connected as the resonant-frequency regulator 30 between the node of the choke coils 32 and 33 and ground.

In addition, a termination resistor 34 (e.g., 50Ω) for impedance matching is connected in series between the bypass capacitor 31 and ground.

[Operation and Advantage of Third Embodiment]

In the case of the mobile phone of the third embodiment, the choke coil 32 eliminates high-frequency components from the drive signal for the vibration unit 10 immediately after the drive signal was output from the power management IC 28 and the choke coil 33 further eliminates high-frequency components from the drive signal immediately before it is supplied to the vibration unit 10 and supplies the resulting drive signal to the vibration unit 10. This arrangement allows the vibration unit 10 to be stably driven with the drive signal from which high-frequency components are further eliminated.

The termination resistor 34 achieves impedance matching and also causes the signal line 27 to operate as part of the antenna. This arrangement can further stabilize the antenna operation of the signal line 27 and can achieve further reductions in the electric field strength and the magnetic field strength around the call-voice speaker section 3, and also can provide the same advantages as those of the mobile phones of the embodiments described above.

Fourth Embodiment

A mobile phone according to a fourth embodiment of the present invention will be described next. In the mobile phones of the first to third embodiments described above, the length of the signal line 27 is set to λ/4 of the antenna length. In contrast, the mobile phone of the fourth embodiment is directed to an example of a case in which, even when the length of the signal line 27 is smaller than λ/4 of the antenna length, the signal line 27 can operate as the antenna.

[Configuration of Major Portion of Mobile Phone of Fourth Embodiment]

Figure 11:
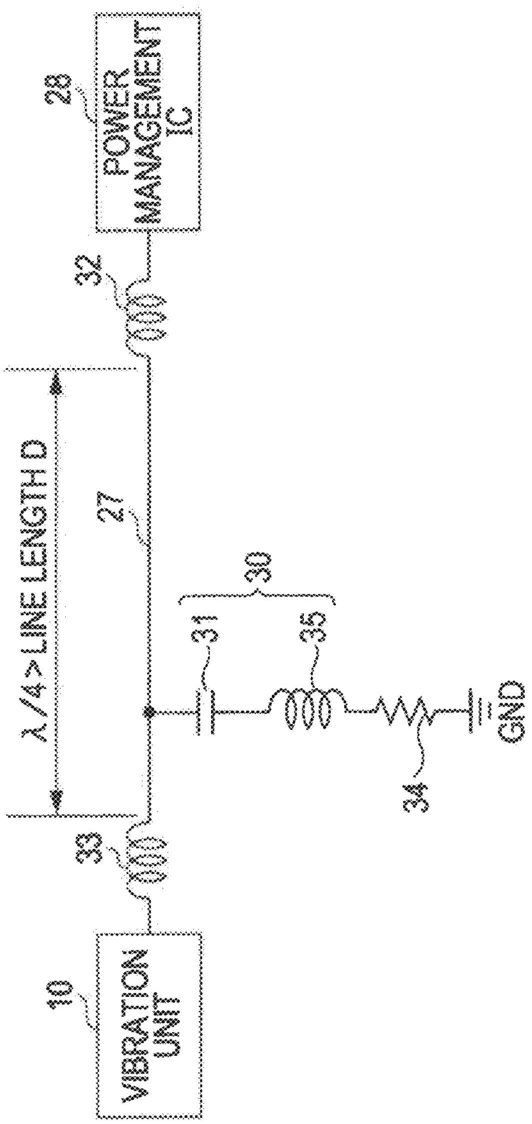
FIG. 11 is a circuit diagram of a major portion of a mobile phone according to a fourth embodiment of the present invention.

FIG. 11 shows a major portion of the mobile phone of the fourth embodiment. As shown in FIG. 11, the mobile phone of the fourth embodiment has a configuration in which the signal line 27 that provides electrical and physical connection between the vibration unit 10 provided in close proximity to the call-voice speaker section 3 and the power management IC 28 provided on the substrate 26, as described above, has a choke coil 32 at a position in close proximity to the power management IC 28 and also has a choke coil 33 at a position in close proximity to the vibration unit 10.

The length D of the signal line 27 between the choke coil 32, provided at the position in close proximity to the power management IC 28, and the choke coil 33, provided at the position in close proximity to the vibration unit 10, is smaller than λ/4 of the antenna length corresponding to a frequency band that the mobile phone uses for the radio communication (i.e., λ/4>D).

A bypass capacitor 31 having a constant that causes a short circuit with respect to a high frequency and that causes an open circuit with respect to the drive signal for the vibration unit 10 is connected as the resonant-frequency regulator 30 between the node of the choke coils 32 and 33 and ground.

A termination resistor 34 (e.g., 50Ω) for impedance matching is connected in series between the bypass capacitor 31 and ground.

In addition, a frequency regulating coil 35 having a constant that causes the signal line 27 to resonate at a frequency that the mobile phone uses for the radio communication when the length of the signal line 27 is smaller than λ/4 of the antenna length is connected in series between the bypass capacitor 31 and the termination resistor 34.

[Operation and Advantage of Fourth Embodiment]

In the case of the mobile phone of the fourth embodiment, the choke coil 32 eliminates high-frequency components from the drive signal for the vibration unit 10 immediately after the drive signal was output from the power management IC 28 and the choke coil 33 further eliminates high-frequency components from the drive signal immediately before it is supplied to the vibration unit 10 and supplies the resulting drive signal to the vibration unit 10. This arrangement allows the vibration unit 10 to be stably driven with the drive signal from which high-frequency components are further eliminated.

The termination resistor 34 achieves impedance matching and also causes the signal line 27 to operate as part of the antenna. This arrangement can further stabilize the antenna operation of the signal line 27 and can achieve further reductions in the electric field strength and the magnetic field strength around the call-voice speaker section 3.

Even when the signal line 27 is smaller than λ/4 of the antenna length, the frequency regulating coil 35 can cause the signal line 27 to resonate at the frequency that the mobile phone uses for the radio communication. This arrangement can cause the signal line 27 to operate as part of the antenna even when the signal line 27 is shorter than λ/4 of the antenna length and can also achieve reductions in the electric field strength and the magnetic field strength around the call-voice speaker section 3. The arrangement can also provide the same advantages as those of the embodiments described above.

Fifth Embodiment

A mobile phone according to a fifth embodiment of the present invention will be described next. The mobile phone of the fourth embodiment described above is directed to an example of a case in which, even when the length of the signal line 27 is smaller than λ/4 of the antenna length, the signal line 27 can operate as the antenna. In contrast, the mobile phone of the fifth embodiment is directed to an example of a case in which, even when the length of the signal line 27 is greater than λ/4 of the antenna length, the signal line 27 can operate as the antenna.

[Configuration of Major Portion of Mobile Phone of Fifth Embodiment]

Figure 12:
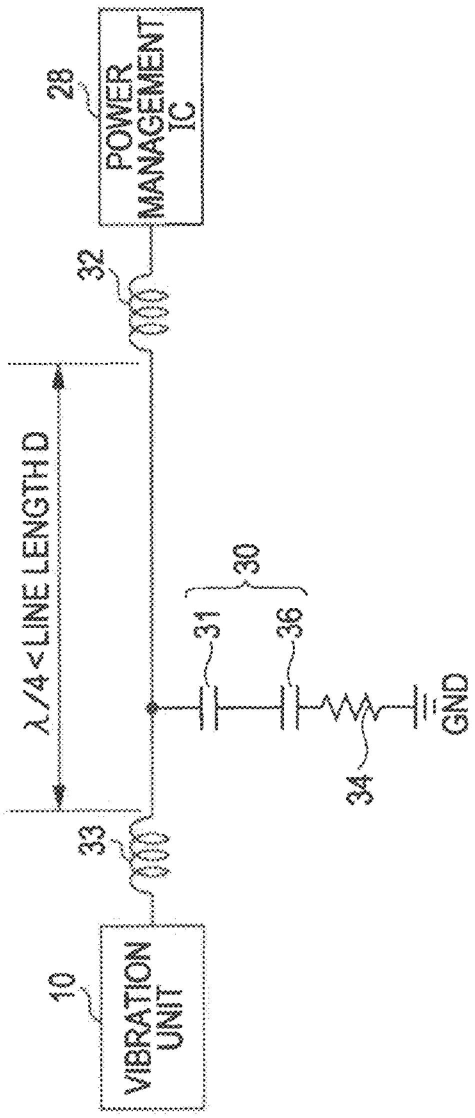
FIG. 12 is a circuit diagram of a major portion of a mobile phone according to a fifth embodiment of the present invention.

FIG. 12 shows a major portion of the mobile phone of the fifth embodiment. As shown in FIG. 12, the mobile phone of the fifth embodiment has a configuration in which the signal line 27 that provides electrical and physical connection between the vibration unit 10 provided in close proximity to the call-voice speaker section 3 and the power management IC 28 provided on the substrate 26, as described above, has a choke coil 32 at a position in close proximity to the power management IC 28 and also has a choke coil 33 at a position in close proximity to the vibration unit 10.

The length D of the signal line 27 between the choke coil 32, provided at the position in close proximity to the power management IC 28, and the choke coil 33, provided at the position in close proximity to the vibration unit 10, is greater than λ/4 of the antenna length corresponding to a frequency band that the mobile phone uses for the radio communication (i.e., λ/4<D).

A bypass capacitor 31 having a constant that causes a short circuit with respect to a high frequency and that causes an open circuit with respect to the drive signal for the vibration unit 10 is connected as the resonant-frequency regulator 30 between the node of the choke coils 32 and 33 and ground.

A termination resistor 34 (e.g., 50Ω) for impedance matching is connected in series between the bypass capacitor 31 and ground.

In addition, a frequency regulating capacitor 36 having a constant that causes the signal line 27 to resonate at a frequency that the mobile phone uses for the radio communication when the length of the signal line 27 is greater than λ/4 of the signal line is connected in series between the bypass capacitor 31 and the termination resistor 34.

[Operation and Advantage of Fifth Embodiment]

In the case of the mobile phone of the fifth embodiment, the choke coil 32 eliminates high-frequency components from the drive signal for the vibration unit 10 immediately after the drive signal was output from the power management IC 28 and the choke coil 33 further eliminates high-frequency components from the drive signal immediately before it is supplied to the vibration unit 10 and supplies the resulting drive signal to the vibration unit 10. This arrangement allows the vibration unit 10 to be stably driven with the drive signal from which high-frequency components are further eliminated.

The termination resistor 34 achieves impedance matching and also causes the signal line 27 to operate as part of the antenna. This arrangement can further stabilize the antenna operation of the signal line 27 and can achieve further reductions in the electric field strength and the magnetic field strength around the call-voice speaker section 3.

Even when the signal line 27 is greater than λ/4 of the antenna length, the frequency regulating capacitor 36 can cause the signal line 27 to resonate at the frequency that the mobile phone uses for the radio communication. This arrangement can cause the signal line 27 to operate as part of the antenna even when the signal line 27 is greater than λ/4 of the antenna length and can also achieve reductions in the electric field strength and the magnetic field strength around the call-voice speaker section 3. The arrangement can also provide the same advantages as those of the embodiments described above.

Sixth Embodiment

A mobile phone according to a sixth embodiment of the present invention will be described next. The mobile phones of the embodiments described above are directed to an example in which the signal line 27 for the vibration unit 10 provided in the vicinity of the call-voice speaker section 3 is caused to operate as part of the antenna. In contrast, the mobile phone of the sixth embodiment is directed to an example in which the signal line for the power on/off switch 22 provided in the vicinity of the call-voice speaker section 3, as described above with reference to FIGS. 2 to 4, is caused to operate as part of the antenna.

[Configuration of Major Portion of Mobile Phone of Sixth Embodiment]

Figure 13:
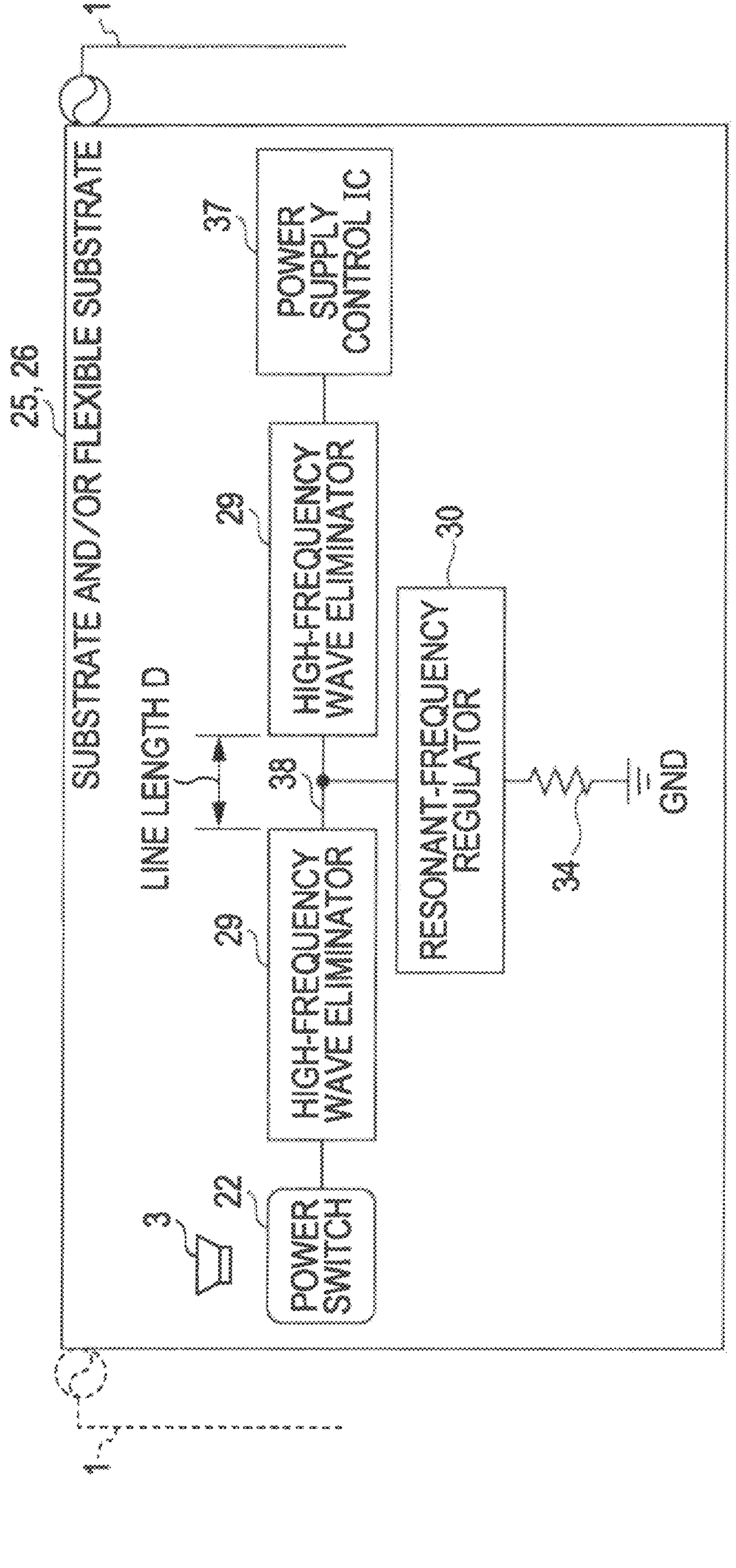
FIG. 13 is a block diagram of a major portion of a mobile phone according to a sixth embodiment of the present invention.

FIG. 13 shows a major portion of the mobile phone of the sixth embodiment. As shown in FIG. 13, the mobile phone of the sixth embodiment has a signal line 38 that provides electrical and physical connection between the power on/off switch 22, provided on the flexible substrate 25 so as to be located in close proximity to the call-voice speaker section 3, and a power-supply control IC 37 provided on the substrate 26.

The signal line 38 has a high-frequency wave eliminator 29, such as the above-described choke coil 32, at a position in close proximity to the power-supply control IC 37 and also has a high-frequency wave eliminator 29, such as the above-described choke coil 33, at a position in close proximity to the power on/off switch 22.

A resonant-frequency regulator 30 and a termination resistor 34 (e.g., 50Ω) for impedance matching are sequentially connected in series between the signal line 38, provided between the high-frequency wave eliminators 29, and ground.

When the length of the signal line 38 between the high-frequency wave eliminators 29 is λ/4 of the antenna length, only the bypass capacitor 31 may be provided as the resonant-frequency regulator 30, as described above in the first to third embodiments.

When the length of the signal line 38 between the high-frequency wave eliminators 29 is smaller than λ/4 of the antenna length, the frequency regulating coil 35 having a predetermined constant, in conjunction with the bypass capacitor 31, may be provided as the resonant-frequency regulator 30, as described above in the fourth embodiment.

When the length of the signal line 38 between the high-frequency wave eliminators 29 is greater than λ/4 of the antenna length, the frequency regulating capacitor 36 having a predetermined constant, in conjunction with the bypass capacitor 31, may be provided as the resonant-frequency regulator 30, as described above in the fifth embodiment.

[Operation and Advantage of Sixth Embodiment]

In the case of the mobile phone of the sixth embodiment, it is possible to cause the signal line 38 for the power on/off switch 22 to operate as part of the antenna by causing the signal line 38 to resonate at a frequency that the mobile phone uses for the radio communication, in the same manner as the mobile phones of the embodiments described above. Thus, since the electric field strength ant the magnetic field strength around the call-voice speaker section 3 can be reduced, it is possible to offer the same advantages as those of the mobile phones of the embodiments described above.

[Modifications]

In the embodiments described above, the signal line 27 for the vibration unit 10 provided in the vicinity of the call-voice speaker section 3 or the signal line 38 for the power on/off switch 22 provided in the vicinity of the call-voice speaker section 3 is used as the signal line that is caused to operate as part of the antenna.

The mobile phones described above as examples of the present invention are aimed to reduce an electric field strength and a magnetic field strength around the call-voice speaker section 3 that is brought close to the human ear during a phone call. This is because the signal line 27 for the vibration unit 10 and the signal line 38 for the power on/off switch 22 are provided in the vicinity of a portion (i.e., around the call-voice speaker section 3) at which the electric field strength and the magnetic field strength are to be reduced.

That is, the present invention is applicable to a signal line for any electrical member that is provided in close proximity to a portion at which the electric field strength and the magnetic field strength are to be reduced. In such a case, it is also possible to provide the same advantages as those of the embodiments described above.

Although the above-described embodiments are examples in which the present invention is applied to a mobile phone, the present invention is also applicable to various other electronic equipment, such as a PHS (personal handyphone system) phone, a PDA (personal digital assistant) device, a digital camera device, a digital video camera device, a notebook or desktop personal computer, a television receiver, and a music player device. In any case, it is also possible to provide the same advantages as those of the embodiments described above.

The embodiments described above are merely examples of the present invention. Thus, the present invention is not limited to the embodiments described above, and needleless to say, various changes and modifications can be made thereto depending on the design or the like, without departing from the spirit and scope of the present invention.

What is claimed is:

1. An electromagnetic field strength reducing device comprising:

a high-frequency wave eliminator that eliminates a high frequency component from an electrical signal input from a signal source;

an electrical signal line disposed between the high frequency wave eliminator and an electrical member so as to convey the electrical signal with the high frequency component eliminated to the electrical member; and a resonant-frequency regulator connected between the electrical signal line and ground to cause the electrical signal line to be resonant at a frequency used for radio communication.

2. The electromagnetic field strength reducing device of claim 1, wherein said high-frequency wave eliminator is disposed between at least one of said electrical signal line and said electrical member, and said electrical signal line and said signal source.

3. The electromagnetic field strength reducing device of claim 1, wherein said high-frequency wave eliminator includes at least one choke coil.

4. The electromagnetic field strength reducing device of claim 1, wherein a length of said electrical signal line is a resonance length for the frequency used for radio communications.

5. The electromagnetic field strength reducing device of claim 1, wherein said high-frequency wave eliminator is configured to protect at least one of a speaker, motor, vibration unit, and on/off switch as said electrical member.

6. The electromagnetic field strength reducing device of claim 1, wherein said resonant-frequency regulator at least includes a capacitor having a capacitance that provides a low resistance path to ground for the frequency used for radio communications.

7. The electromagnetic field strength reducing device of claim 1, wherein:

a length of said electrical signal line is not an integer fractional resonant length for said frequency used for radio communication, and said resonant-frequency regulator includes at least one reactive component.

8. The electromagnetic field strength reducing device of claim 1, wherein said resonant-frequency regulator provides impedance matching for said electrical signal line so said electrical signal line can serve as an antenna element for a portable electronic device with a HAC standard radio frequency communication compliance requirement.

9. A radio communications apparatus, comprising:

an electromagnetic field strength reducing device having a high-frequency wave eliminator that eliminates a high frequency component from an electrical signal input from a signal source, an electrical signal line disposed between the high-frequency wave eliminator and an electrical member so as to convey the electrical signal with the high frequency component eliminated to the electrical member, and a resonant-frequency regulator connected between the electrical signal line and ground to cause the electrical signal line to be resonant at a frequency used for radio communication.

10. The radio communications apparatus of claim 9, wherein said high-frequency wave eliminator is disposed between at least one of said electrical signal line and said electrical member, and said electrical signal line and said signal source.

11. The radio communications apparatus of claim 9, wherein said high-frequency wave eliminator includes at least one choke coil.

12. The radio communications apparatus of claim 9, wherein a length of said electrical signal line is a resonance length for the frequency used for radio communications.

13. The radio communications apparatus of claim 9, wherein said high-frequency wave eliminator is configured to protect at least one of a speaker, motor, vibration unit, and on/off switch as said electrical member.

14. The radio communications apparatus of claim 9, wherein said resonant-frequency regulator at least includes a capacitor having a capacitance that provides a low resistance path to ground for the frequency used for radio communications.

15. The radio communications apparatus of claim 9, wherein:

a length of said electrical signal line is not an integer fractional resonant length for said frequency used for radio communication, and said resonant-frequency regulator includes at least one reactive component.

16. The radio communications apparatus of claim 9, wherein said radio communication apparatus has a HAC standard radio frequency communication requirement, and said resonant-frequency regulator provides impedance matching for said electrical signal line so said electrical signal line can serve as an antenna element.

17. An electromagnetic field strength reducing method comprising:

inputting an electrical signal from a signal source;

eliminating a high frequency component of the electrical signal with a high-frequency wave eliminator;

conveying the electrical signal with the high frequency component eliminated to an electrical member via an electrical signal line;

regulating a resonance frequency of said electrical signal line with a resonant-frequency regulator connected between the electrical signal line and ground to cause the electrical signal line to be resonant at a frequency used for radio communication.

18. The electromagnetic field strength reducing method of claim 17, wherein said elimination step eliminates said high frequency component at one of at a location where the signal source inputs said electrical signal, and at a location where said electrical signal is provided to said electrical member.

19. The electromagnetic field strength reducing method of claim 17, wherein said regulation step includes shunting the high frequency component to ground.

20. The electromagnetic field strength reducing method of claim 17, further comprising:

matching an impedance of said electrical signal line to enable said electrical signal line to serve as an antenna for radio communication at said frequency.

* * * * *